United States Patent [19]

Kawamura

[11] Patent Number: 5,095,872
[45] Date of Patent: Mar. 17, 1992

[54] ALCOHOL ENGINE WITH COMBUSTION CAVITY

[75] Inventor: Hideo Kawamura, Samukawa, Japan

[73] Assignee: Isuzu Motors Ltd, Tokyo, Japan

[21] Appl. No.: 590,828

[22] Filed: Oct. 1, 1990

[30] Foreign Application Priority Data

Sep. 29, 1989 [JP] Japan .................. 1-252277

[51] Int. Cl.$^5$ .................................. F02B 19/04
[52] U.S. Cl. ........................ 123/254; 123/261; 123/270; 123/289
[58] Field of Search ............ 123/254, 255, 261, 270, 123/271, 289

[56] References Cited

U.S. PATENT DOCUMENTS

| | | | |
|---|---|---|---|
| 3,140,697 | 7/1964 | Deras | 123/254 |
| 3,954,089 | 5/1976 | Hardesty et al. | 123/261 |
| 4,254,751 | 3/1981 | Conti | 123/261 |
| 4,368,702 | 1/1983 | Finsterwalder et al. | 123/261 |
| 4,369,746 | 1/1983 | Thring | 123/261 |
| 4,444,166 | 4/1984 | Kovacs et al. | 123/254 |
| 4,738,227 | 4/1988 | Kamo et al. | 123/254 |
| 4,998,517 | 3/1991 | Kawamura | 123/270 |

FOREIGN PATENT DOCUMENTS

| | | |
|---|---|---|
| 612798 | 10/1926 | France . |
| 1006447 | 4/1953 | France . |
| 1373099 | 8/1964 | France . |
| 53-88413 | 8/1978 | Japan . |
| 202768 | 12/1988 | Japan . |
| 735834 | 8/1955 | United Kingdom . |

OTHER PUBLICATIONS

Patent Abstract of Japan, vol. 12, No. 134, (M-689) (2981) 23 Apr. 1988, * JP-A-62 255519 (Toyota) 07 Nov. 1987, "Swirl Chamber for Internal Combustion Engine".
Patent Abstract of Japan, vol. 14, No. 209 (M-968) (4152) 27 Apr. 1990, & JP-A-2 45612 (Isuzu) 15 Feb. 1990, "Heat Insulation Engine".
Internal Combustion Engine, vol. 27, No. 345, Jul. 1988, Nippon Clean Lab. Co., Osaka; Strafied Charge Engine by Imprigement of Fuel Jet (Oska).

*Primary Examiner*—Tony M. Argenbright
*Attorney, Agent, or Firm*—Browdy and Neimark

[57] ABSTRACT

An alcohol engine with combustion cavity of this invention includes combustion cavity blocks for constituting combustion cavities of a heat-insulating structure, disposed in a cylinder head, communication ports of a heat-insulating structure for communication between main combustion chambers and the combustion cavities and fuel injection nozzles each including a nozzle main body extending to the center portion of the combustion cavity and multi-injection injection ports formed around the tip of the nozzle main body and opening in such a manner as to face the center inner peripheral wall surface of the combustion cavity. The combustion cavity blocks comprises a thin ceramic inner wall member, a heat-insulating member and a metallic outer cylinder, raises quickly the wall temperature of the combustion cavity at the time of a low temperature to supply sufficient vaporization energy to an alcohol fuel, cools the wall surface by the alcohol fuel at the time of a high temperature to limit the rise of the temperature of the combustion cavity and performs main combustion in a combustion cavity to restrict the formation of NOx. Further, a protuberance is formed at each piston head portion and closes the center portion of each communication port at the time of the rise of the piston so as to define a ring-like passage. The injection flow from this ring-like passage promotes mixing between the fuel and air.

10 Claims, 2 Drawing Sheets

5,095,872

ALCOHOL ENGINE WITH COMBUSTION CAVITY

BACKGROUND OF THE INVENTION:

1. Field of the Invention:

This invention relates to an alcohol engine with combustion cavity which allows main combustion chambers to communicate with combustion cavities via communication ports and is equipped with fuel injection nozzles in the combustion cavities.

2. Description of the Prior Art:

Environmental pollution by exhaust gases emitted from engines has become a serious problem in recent years and alcohol engines have attracted increasing attention. In the alcohol engine, the contents of carbonic acid gas and carbides in the exhaust gas are extremely small in comparison with other fuels such as gasoline and gas oil. A Diesel engine using alcohol fuel however involves a problem of poor ignitability. In other words, alcohol has larger latent heat for vaporization than gasoline. For example, whereas gasoline requires latent heat of vaporization of 0.7% of the fuel, alcohol requires latent heat of vaporization of 5% of the fuel; hence, the alcohol fuel is difficult to vaporize. Moreover, the alcohol fuel injected from fuel injection nozzles into compressed air inside the combustion chambers lowers the temperatures of compressed air and wall surfaces of the combustion chambers due to vaporization and thus reduces ignitability.

A laminar intake engine system utilizing a collision injection flow of a fuel, or in other words, a methano engine having combustion chambers of a fuel collision diffusion system, which forms a collision portion by sticking out the piston head center portion of a piston and forms a recessed cavity around this collision portion is known (e.g. "Internal Combustion Engine", Vol. 27, No. 345, July, 1988, pp. 35 to 42). In the internal combustion engine having these combustion chambers, the fuel injected from a single-hole nozzle of the fuel injection nozzles is caused to impinge against the projection portion of the piston head and is diffused in a disc-like form. Then, the fuel is mixed with air and forms a fuel-air mixture while being entrapped at the lower part of the cavity by the squish flow generated by the rise of the piston.

In the fuel injection nozzles, the nozzles having the injection ports which are formed in two stages and multiple injection ports are disclosed, for example, in Japanese Patent Laid-Open No. 88413/1978 and Japanese Utility Model Laid-Open No. 202768/1988.

However, the methanol engine using the pistons equipped with the fuel collision diffusion type combustion chambers described above involves the problem that, when a very small quantity of fuel is injected from the fuel injection nozzles at the time of a partial load, dispersibility of the fuel is poor and carbon is deposited on the collision portion.

The calorific value of alcohol fuel is about 6000 Kcal/kg and this value is about a half of that of light oil. For this reason, the fuel injection quantity of the alcohol fuel must be greater than that of the light oil. When the fuel consisting primarily of the alcohol fuel is burnt in the engine in the diesel cycle, therefore, the combustion process, the combustion chambers, the injection system, and the like, are different from those of ordinary engines because the heat of vaporization is great, the calorific value is small, and so forth. In the alcohol engine using the alcohol as the fuel, the behavior of combustion at the time of the partial load is remarkably different from that at the time of high load.

When methanol fuel is used as the alcohol fuel, for example, the heat of compressed air is deprived due to vaporization of the fuel in the alcohol engine because the alcohol has a large heat of vaporization as described above and unburnt intermediate products are exhausted in many cases. Therefore, the following two main factors must be solved with the alcohol engine.

The first factor is that the combustion chamber must be of heat-insulating structure and the temperature rise of the combustion chamber wall high in order to supply the energy of vaporization to the atomized alcohol fuel at the time of a low temperature such as in the partial load operation of the engine. In the heat-insulating engine, however, the combustion chamber wall does not reach a high temperature so much at the time of partial load, so that ignitability and combustion are not good, misfiring and incomplete combustion takes place and, unburnt gas is likely to occur. Because the alcohol fuel needs large latent heat for vaporization, the inner wall surface of the combustion chamber does not reach a high temperature during the low speed low load operation of the engine. Therefore, the wall surface cannot absorb from the fuel the heat of vaporization and promote vaporization, and a vaporization mixture cannot be obtained easily. As a result, combustion becomes incomplete and the generation of unburnt gas is remarkable.

The second factor is that the wall member of the combustion chambers is cooled by the alcohol fuel at the time of high temperature such as in the full load operation of the engine and the temperature of the combustion chambers is not kept at very high temperature. In the heat-insulating engines, however, the wall of the combustion chambers attains a high temperature at the time of the high load. For this reason, though ignition and combustion of the fuel are effected satisfactorily, suction efficiency is likely to drop and abnormal ignition and combustion is likely to occur if the combustion chambers is at an excessively high temperature.

SUMMARY OF THE INVENTION

It is a primary object of the present invention to solve the problems described above and to provide an alcohol engine with a combustion cavity having a construction wherein combustion cavities and communication ports are constituted in a heat-insulating structure in order to supply sufficient vaporization energy to the alcohol fuel atomized from fuel injection nozzles disposed in the combustion cavities and to accelerate the temperature rise of the wall of combustion chambers; the fuel injection nozzles are formed in a multiple jet port arrangement in order to promote vaporization of large quantities of alcohol fuel; the fuel injection direction of the fuel injected from the multiple injection ports and the flowing direction of intake air by a squish flow are caused to cross one another orthogonally so as to promote mixing between the fuel and air; the temperature of the wall surface of the combustion cavities and communication ports are immediately raised at the time of a low temperature such as during a partial load operation of the engine; and the wall surface of the combustion cavities is cooled by the alcohol fuel at the time of a high temperature such as during a full load operation of the engine so as to limit vaporization of the fuel inside a nozzle main body positioned inside each combustion cavity and to make atomization excellent.

It is another object of the present invention to provide an alcohol engine with a combustion cavity having a construction wherein each of the fuel injection nozzles comprising a ceramic nozzle main body having high heat-resistance is disposed at the center portion of each combustion cavity, the injection ports of the fuel injection nozzle are set in such a manner as to open at the center portion of the combustion cavity and to face the wall surface of the combustion cavity; the fuel atomization is diffused and injected uniformly and outwardly in a radial direction so as to impinge against the wall surface of the combustion cavity and to let the inflowing direction of intake air due to the squish flow to the combustion cavity and the injection direction from the fuel injection nozzle cross each other orthogonally; vaporization and mixing of the alcohol fuel with intake air can be accomplished satisfactorily for successful combustion so as to prevent emission of an unburnt fuel or intermediate products; and main combustion is effected in each combustion cavity so as to limit the formation of NOx.

It is still another object of the present invention to provide an alcohol engine with combustion cavity which includes combustion cavity blocks for forming combustion cavities of a heat-insulating structure, which is disposed in a cylinder head; communication ports of a heat-insulating structure for communication between main combustion chambers and the combustion cavities; and fuel injection nozzles which have a nozzle main body made of a ceramic material having high heat resistance and insulation and high alcohol resistance such as silicon nitride, silicon carbide, or the like, and extend to the center portion of each combustion cavity, and a fuel injection nozzle having multiple injection ports formed around the tip of the nozzle main body and opening so as to oppose the center inner peripheral wall of the combustion cavity.

It is still another object of the present invention to provide an alcohol engine with combustion cavity having a construction wherein its combustion cavity block is composed of a thin inner wall member made of a ceramic material having high heat resistance and high alcohol resistance such as silicon nitride and silicon carbide, a heat-insulating member disposed on the outer surface of the inner wall member and made of a material of aluminum titanate having low heat conductivity and a metallic outer cylinder disposed around the outer periphery of the heat-insulating member so as to reduce the thermal capacity of the inner wall member, that is, the wall surface facing the combustion cavity and to enable the inner wall member to rapidly follow up the combustion gas temperature and the alcohol fuel temperature; the temperature of the combustion cavity is controlled to an optimum temperature so that only the temperature of the inner wall member of the combustion cavity can be quickly raised by the combustion gas at the time of low temperature such as in a partial load operation of the engine and a mixture of the alcohol fuel atomized from the fuel injection nozzles and intake air can be quickly ignited and burnt; each combustion cavity can be cooled to the optimum temperature by the alcohol fuel atomized from the fuel injection nozzles at the time of high temperature such as in the full load operation of the engine and the temperature rise of the combustion cavity can be limited; and overheating of the nozzle main body of each fuel injection nozzle positioned inside the combustion cavity can be prevented and good atomization of the fuel can be attained by limiting the vaporization of the fuel inside the nozzle main body of the fuel injection nozzle.

Accordingly, the atomization state does not become abnormal due to the vaporization of the alcohol fuel existing inside the fuel injection nozzles at the time of high temperature such as at the time of the full load but atomization from the fuel injection nozzle an be effected normally and ignition and combustion of the fuel that follow can be made smoothly. Therefore, the drop of suction efficiency due to the excessive high temperature of each combustion cavity, communication port and main combustion chamber does not occur.

It is still another object of the present invention to provide an alcohol engine with combustion cavity having the construction wherein a protuberance is formed at the piston head portion of each piston reciprocating inside each cylinder liner; the protuberance closes the center portion of each communication port when the piston rises, and defines a ring-like passage and moreover, an edge at the end of the communication port, so that intake air flowing from each main combustion chamber into each combustion cavity through the communication port becomes an injection flow or in other words, a squish flow; this squish flow crosses the injected fuel and forms a swirl around the nozzle main body and hence, a good fuel-air mixture; and the intake air and the alcohol fuel can thus form a good mixture.

It is still another object of the present invention to provide an alcohol engine with combustion cavity which can reduce the air-fuel ratio and can restrict a fuel equivalent ratio; which effects main combustion inside each combustion cavity an can limit the formation of NOx; which blows a flame from the combustion cavity to each main combustion chamber but does not exhaust stroke even if the alcohol fuel injected from the fuel injection nozzles to the wall surface of the communication port adheres to the wall surface, because this adhering fuel is burnt and reacts when the flame is blown out; and which can further limit the formation of NOx because the flame is blown out from each combustion cavity, so that the fuel equivalent ratio drops drastically and the combustion temperature drops as well.

It is still another object of the present invention to provide an alcohol engine with combustion cavity which can operate not only in four-stroke cycle of an intake stroke, a compression stroke, an expansion stroke and an exhaust stroke but also in two-cycle, which can enlarge the fuel equivalent ratio inside combustion cavities in the two-cycle operation by limiting the intake air quantity and can reduce emission of NOx.

It is still another object of the present invention to provide an alcohol engine with combustion cavity which can supply sufficient vaporization energy to the alcohol fuel injected from fuel injection nozzles in combustion cavities, whereby the injecting direction from the fuel injection nozzles crosses orthogonally the flowing direction of intake air into the combustion cavities; which constitutes the injection port of each fuel injection nozzle in multi-injection injection ports, so that the atomization of the fuel injected therefrom can be dispersed uniformly onto the inner wall surface of each combustion cavity and can impinge against the inner wall and mixing between the alcohol fuel and intake air can be made excellently; and which sets the positions of the injection ports $\frac{1}{4}$ to $\frac{3}{4}$ of the full length of the combustion cavity away from the upper wall surface of the combustion cavity and in such a manner as to face the center inner wall surface of the combustion cavity. According to this structure, a space is formed in the slipstream inside the combustion cavity, the atomization of the alcohol fuel and intake air can be mixed ideally and diffused; moreover, turbulence of the mixture of the atomized fuel and intake air injected into the combustion cavity is promoted around the nozzle main body, vaporization/mixture can be accomplished excellently and hence, excellent combustion can be attained. Therefore, emission of the unburnt fuel or intermediate products can be prevented and the formation of NOx can be limited by effecting main combustion inside the combustion cavity. Then, since a flame is blown out from each combustion cavity, the fuel equivalent ratio drops drastically and the combustion temperature drops, so that the formation of NOx can be further reduced.

DESCRIPTION OF THE PREFERRED EMBODIMENT:

Hereinafter, an embodiment of the alcohol engine with combustion cavity in accordance with the present invention will be described with reference to the accompanying drawings.

Figure 1:
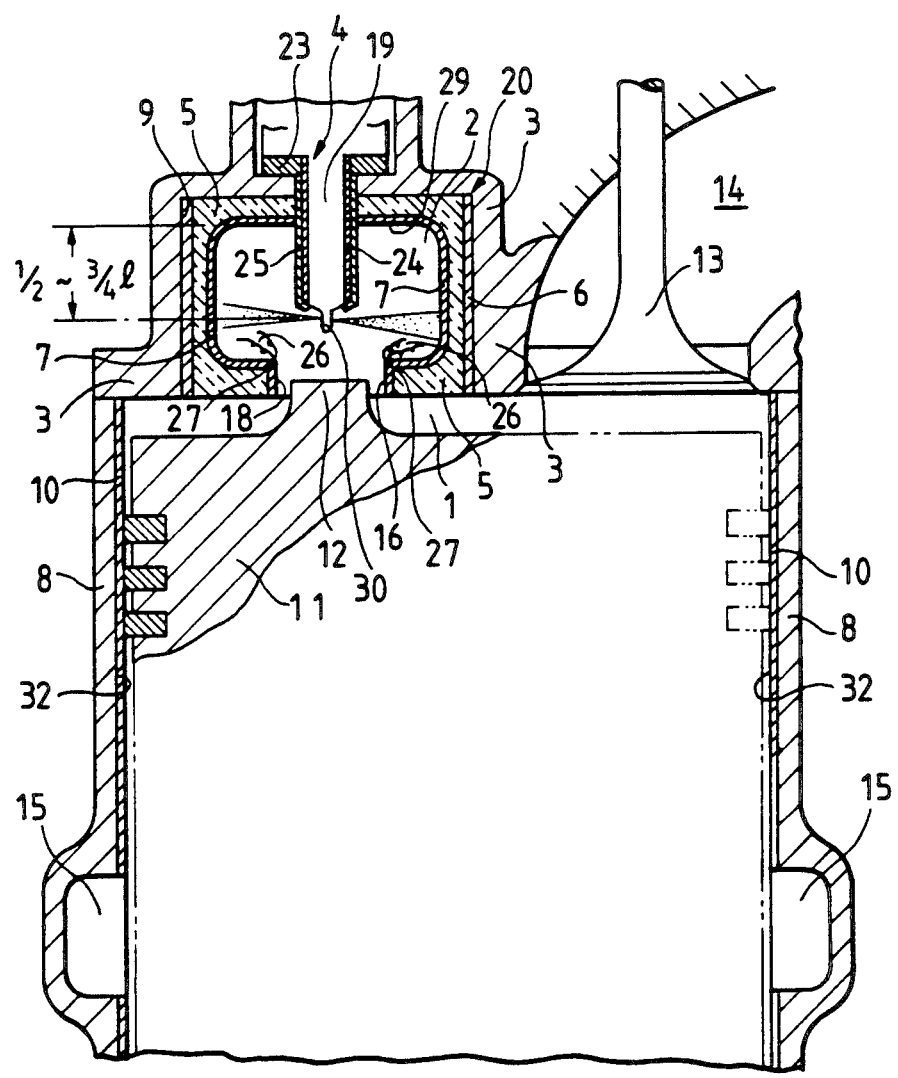
FIG. 1 is a sectional view showing an embodiment of an alcohol engine with combustion cavity in accordance with the present invention.

FIG. 1 shows an embodiment of the alcohol engine with combustion cavity in accordance with the present invention. This alcohol engine with combustion cavity comprises main combustion chambers 1, combustion cavity blocks 20 for constituting combustion cavities 2 disposed above the main combustion chambers 1 and fuel injection nozzle 4 having their injection ports 17 opening at the center of the combustion cavities 2. The combustion cavity block 20 is disposed in a hole portion 9 formed in a cylinder head 3 and is constituted in a heat-insulating structure. The cylinder head 3 is fixed to a cylinder block 8 through a gasket. Cylinder liners 10 constituting cylinders fit into the hole portions 32 bored in the cylinder block 8.

Each main combustion chamber 1 is formed by the cylinder and is defined by the region encompassed by the head lower surface portion of the cylinder head 3, the cylinder liner 10 and the piston head upper surface of the piston 11. Therefore, the surface forming the main combustion chamber 1, that is, the head lower surface portion, the cylinder liner 10 and the piston head portion of the piston 11, are preferably made of a ceramic material having high heat resistance, high corrosion resistance and high alcohol resistance.

A communication port 16 that communicates each main combustion chamber 1 with each combustion cavity 2 is formed in the lower surface portion of the cylinder head 3 and in a heat-insulating structure. A cut-up portion or in other words, an edge 27, is formed at the end of the communication port 16 communicating with the combustion cavity 2 and this edge 27 converts the air flow flowing from the communication port 16 to the combustion cavity 2 into a push-in flow, that is, a squish flow 26. In this alcohol engine with combustion cavity, an exhaust port 14 is formed in the cylinder head 3 and an exhaust valve 13 is disposed at this exhaust port 14 in such a fashion that it is opened and closed while being guided by a valve guide. This alcohol engine with combustion cavity is operated as a two-cycle engine and an intake port 15 is formed at the lower part of the cylinder block 8 to which each cylinder line 10 is fitted. It is of course possible to constitute this alcohol engine as a four-cycle engine by forming the intake port in the cylinder head, though it is not shown in the drawings. Glow plugs or spark plugs are not shown disposed in the drawings but they can be disposed at suitable positions such as in the combustion cavities 2 or in the communication ports 16 in order to ignite the fuel-air mixture.

This alcohol engine with combustion cavity is particularly characterized in that the fuel injection nozzles 4 for injecting the alcohol fuel, which have nozzle main body 19 extending to the center portion of each combustion cavity 2 and multi-stage multi injection injection ports 17 around the nozzle main body 19, are disposed. Each fuel injection nozzle 4 is fixed to the cylinder head 3 through a heat-shielding cylinder 23 and since the nozzle main body 19 having a needle valve disposed therein penetrates through the heat-insulating member 5 and an inner wall member 7 constituting the combustion cavity 2, the nozzle main body 19 is disposed through the center portion of the combustion chamber 2. This nozzle main body 19 extends to the center portion of the combustion cavity 2 and has the multi-injection injection ports 17 that are formed at the tip peripheral portion 30 of the nozzle main body 19 and are open so as to face the inner peripheral wall surface of the combustion cavity. The positions of disposition of the injection ports 17 are preferably set to be 1/2 to 1/4 away from the upper surface 29 of the combustion cavity 2 with 1 representing the height from the upper surface 29 of the combustion cavity 2 to the edge 27 of the communication port 16 on the lower surface.

In the alcohol engine with combustion cavity, if the positions of the injection ports 17 of the fuel injection nozzle 4 are set in the manner described above, a space is formed in the slipflow inside the combustion cavity 2 and atomization of the alcohol fuel and intake air can be ideally mixed and diffused. Furthermore, the fuel injection timing of the fuel injection nozzle 4 is set before the upper dead point of the compression stroke. When the alcohol fuel injected from the fuel injection nozzles 4 impinges against the inner wall surface of the inner wall member 7 of the combustion cavity 2 under the state where combustion becomes vigorous and the wall temperature of the combustion cavity 2 is high, the alcohol fuel bursts and scatters when the wall temperature is 300° C. or higher, and this fuel atomization mixes all the more excellently with the intake air. When the wall temperature is low, on the other hand, a good mixture can be formed with the intake air due to the collision energy of the injected alcohol fuel. A protuberance 12 is formed at the piston head of each piston 11 facing the communication port 16. Accordingly, the passage of the communication port 16 is narrowed in the ring-like form by the protuberance 12 at, or near, the upper dead point of the compression stroke where the piston 11 rises. In consequence, the alcohol fuel atomized from each fuel injection nozzle 4 before the upper dead point of the compression stroke forms a good fuel-air mixture as the squish along with the intake air and is pushed into the combustion cavity 2. Moreover, since the nozzle main body 19 penetrates through the center portion of the combustion cavity 2, good turbulence is formed around the nozzle main body 19.

In this alcohol engine with combustion cavity, the combustion cavity block 20 that constitutes the heat-insulating structure of the combustion cavity 2 comprises the heat-insulating member 5 made of a material having low heat conductivity such as aluminum titanate, potassium titanate or sodium titanate, a metallic outer cylinder 6 fitted to the outer periphery of this heat-insulating member 5 and a thin inner wall member 7 disposed on the inner surface of the heat-insulating member 5 and made of a heat- and alcohol-resistant ceramic material such as silicon nitride $Si_3N_4$), silicon carbide (SiC), a composite material. The metallic outer cylinder 6 is fitted to the outer periphery of the heat-insulating member 5 by shrinkage fit and ensures the strength of the combustion cavity block 20. Further, the heat-insulating member 5 can be caused to function as a buffer material for absorbing the impact applied to the inner wall member 7 at the time of explosion by making it from a material having a low Young's modulus. The heat-insulating structure of the communication port 16 is formed as the extension of the combustion cavity 2 and is constituted in the same way as the heat-insulating structure of the combustion cavity 2.

In this structure, the combustion cavity 2 and the inner wall member 7 forming the communication port 16 are constituted as a structural member by synthesizing thin ceramic fibers such as silicon carbide (SiC), silicon nitride $Si_3N_4$), with powder, its entire outer surface is covered with the heat-insulating member 5 and it is constituted in the arrangement wherein it does not come into direct contact with the metallic outer cylinder 6 and with the cylinder head 3. Moreover, the shell structure of the inner wall member 7 is formed by molding the inner wall member 7 integrally with the heat-insulating member 5 positioned outside it. Accordingly, the combustion cavity 2 and the communication port 16 can provide a high heat-insulating structure and the heat energy inside the combustion cavity 2 and communication port 16 can be contained reliably inside them. If the combustion cavity 2 and the inner wall member 7 of the communication port 16 are formed in the small thickness structure and in the outer surface heat-insulating structure, response or the follow-up property to the temperature of the mixture of the intake air and the alcohol fuel flowing into the inner wall member 7 and to the combustion temperature can be improved. Furthermore, the combustion cavity 2 is immediately raised to a high temperature suitable for vaporization combustion by the combustion gas at the time of low temperature such as at the start of combustion, partial load, and so forth. At the time of high temperature such as at the time of the full load, the combustion cavity 2 is immediately cooled by the alcohol fuel atomized from the fuel injection nozzles 4 and is likewise brought to the temperature suitable for evaporation combustion. Accordingly, the inner wall temperature of the combustion cavity 2 and communication port 16 can always be kept at the optimum temperature for vaporizing the alcohol fuel.

This alcohol engine with combustion cavity can be operated in two-cycle and in the Diesel engine cycle by taking the intake air from the intake ports 15 formed at the lower part of the cylinder block 8. If the intake air quantity is limited in this case, the fuel equivalent ratio inside the combustion cavity 2 can be made great and the formation of NOx can be limited by effecting the main combustion inside the combustion cavity 2. Moreover, the flame is blown out from the combustion cavity 2 into the main combustion chamber 1 following the combustion inside the combustion cavity 2. Therefore, even if the alcohol fuel adheres to the wall surface 18 of the communication port 16, this adhering fuel is burnt and reacts at the time of blow-out of the flame, so that the unburnt fuel and intermediate products are not exhausted during the exhaust stroke. Since the flame is blown out from the combustion cavity 2, the fuel equivalent ratio drops drastically and the combustion temperature drops. Therefore, the formation of NOx can be further restricted.

Figure 2:
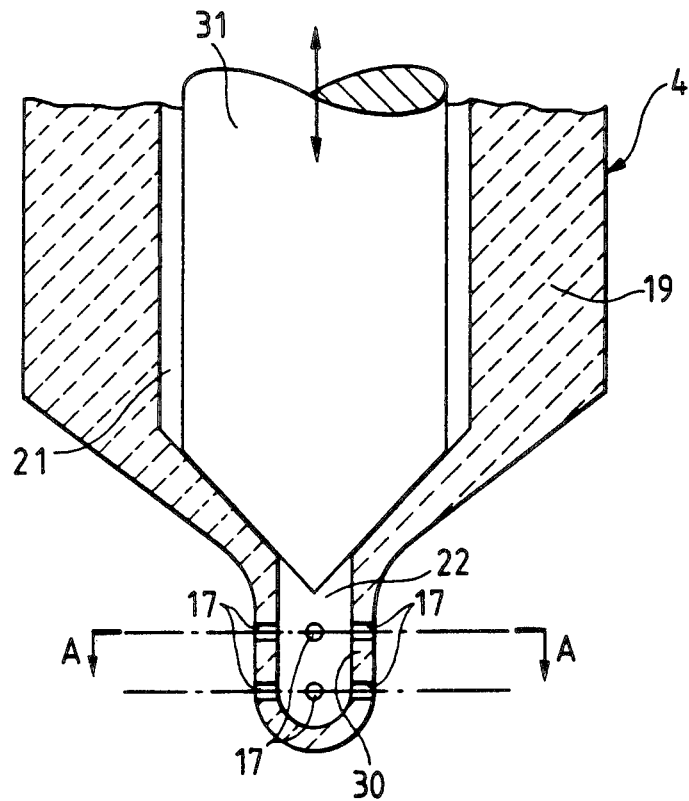
FIG. 2 is a sectional view showing an example of fuel injection nozzles used for the alcohol engine with combustion cavity shown in FIG. 1.
Figure 3:
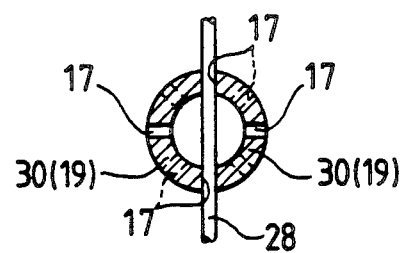
FIG. 3 is a sectional view taken along line A - A in FIG. 2.

Next, an example of the fuel injection nozzle 4 used for this alcohol engine with combustion cavity will be explained with reference to FIGS. 2 and 3. FIG. 2 is a sectional view showing an example of the fuel injection nozzle 4 used in this alcohol engine with combustion cavity and FIG. 3 is a sectional view taken along line A—A of FIG. 2. This fuel injection nozzle 4 comprises a nozzle main body 19 disposed in the combustion cavity 2 and a needle valve 31 capable of moving up and down inside the nozzle main body 19. Since the nozzle main body 19 and the needle valve 31 are disposed inside the combustion chamber of the combustion cavity 2, they are made of a high heat- and alcohol-resistant ceramic material such as silicon nitride $Si_3N_4$), silicon carbide (SiC), a composite material. A heat-insulating member 24 consisting of ceramic fibers such as zirconia fiber is disposed on the outer surface of the nozzle main body 19 as shown in FIG. 1 and a heat-shielding member 25 made of a ceramic material such as silicon nitride $Si_3N_4$), silicon carbide (SiC) is disposed on the outer surface of the heat-insulating member 24 by chemical vapor deposition (CVD), fitting or like means so as to further improve heat resistance. If the fuel injection nozzle 4 is made of the material described above, the problem with sliding motion, the problem of mixture of water, the problem of high temperature, and the like, do not at all cause any trouble. A fuel passage 21 is formed between the inner wall surface of the nozzle main body 19 and the outer surface of the needle valve 31. A nozzle sack 22 as the fuel stay portion and the injection ports 17 for injecting outside the fuel staying in this nozzle sack 22 are formed at the tip of the nozzle main body 19. Accordingly, when the needle valve 31 moves up relative to the nozzle main body 19 due to the injection pressure of the fuel injection pump (not shown) against the spring force, the fuel passage 21 and the nozzle sack 22 communicate with each other, so that the alcohol fuel is uniformly dispersed and atomized from the injection ports 17 formed in the multi-stage multi-injection arrangement in such a manner as to encompass the entire outer periphery of the nozzle main body 19.

The injection ports 17 of the fuel injection nozzles 4 used for this alcohol engine with combustion cavity must be disposed so that atomization can be distributed substantially uniformly inside the combustion cavities 2. Therefore, the greater the number of the injection ports 17 formed in the nozzle main body 19, the more uniform becomes atomization, but if a large number of injection ports are arranged on the same sectional plane, the nozzle main body 17 is likely to get broken or damaged and the boring work of forming the injection ports in the nozzle main body 19 becomes more difficult. To form the injection ports 17 of the fuel injection nozzles 4 in the nozzle main body 19 in the multi-injection arrangement, therefore, the injection ports are formed in multiple stages by deviating their positions from one another in the axial direction of the nozzle main body 19. In other words, the injection ports 17 formed in the fuel injection nozzles 4 are formed throughout the entire peripheral wall portion and moreover, in the multistage multi-injection arrangement. In the drawing, the injection ports are shown formed in two stages in the axial direction of the nozzle main body 19 (see FIG. 2) and four injection ports are shown formed in each stage (see FIG. 3).

The boring work of forming the injection ports in the nozzle main body 19 can be made easily when the number of ports to be formed on the same axis, that is, on the same sectional plane, is even-numbered. For example, four, six, eight, ten or twelve injection ports or the like can be bored by passing a wire 28 through the tip portion 30 of the nozzle main body 19 and in this case, the injection ports are formed in such a manner as to oppose one another. Particularly in the boring work for forming the injection ports in the nozzle main body 19 made of a ceramic material, wire machining can be made by passing the wire 28 through the nozzle main body 19 and accuracy of the injection ports per se can be improved. Moreover, since the injection ports can be formed symmetrically, the positions of the injection ports can be arranged equally and atomization of the alcohol fuel can be made uniformly.

What is claimed is:

1. An alcohol engine with combustion cavity which includes a cylinder block having cylinders for constituting main combustion chambers, a cylinder head fitted to said cylinder block, pistons reciprocating inside said cylinders, combustion cavity blocks for forming combustion cavities of a heat-insulating structure, disposed in said cylinder head, and fuel injection nozzles having injection ports thereof opened to said combustion cavities, wherein:

said alcohol engine includes further communication ports having a heat-insulating structure, for communication between said main combustion chambers and said combustion cavities so that intake air flows as a squish flow from said main combustion chambers to said combustion cavities through said communication ports; and said fuel injection nozzles each include a nozzle main body extending to the center portion of said combustion cavity and multi-injection injection ports formed around the tip of said nozzle main body and opening in such a manner as to face the center inner peripheral wall surface of said combustion cavity, whereby alcohol fuel atomized from said multi-injection injection ports is diffused outward in the radial direction of said injection ports inside said combustion cavities, so that said diffused fuel and the air in said squish flow cross one another and promote mixing between the fuel and air.

2. An alcohol engine with combustion cavity which includes a cylinder block having cylinders for constituting main combustion chambers, a cylinder head fitted to said cylinder block, pistons reciprocating inside said cylinders, combustion cavity blocks for forming combustion cavities of a heat-insulating structure, disposed in said cylinder head, and fuel injection nozzles having injection ports thereof opened to said combustion cavities, wherein:

said alcohol engine includes further communication ports having a heat-insulating structure for communicating between said main combustion chambers and said combustion cavities so that intake air flows as a squish flow from said main combustion chambers to said combustion cavities through said communication ports;

said fuel injection nozzles each include a nozzle main body extending to the center portion of said combustion cavity and multi-injection injection ports formed around the tip of said nozzle main body and opening in such a manner as to face the center inner peripheral wall surface of said combustion cavity, whereby alcohol fuel atomized from said multi-injection injection ports is diffused in a radial direction inside said combustion cavities; and said combustion cavity block consists of a thin ceramic inner wall member constituting the wall surfaces of said combustion cavity and said communication port, a heat-insulating member disposed on the outer surface of said inner wall member and a metallic outer cylinder disposed around the outer periphery of said heat-insulating member.

3. An alcohol engine with combustion cavity according to claim 2, wherein said inner wall member forming each of said combustion cavities is made of silicon carbide.

4. An alcohol engine with combustion cavity according to claim 2, wherein said inner wall member for forming each of said combustion cavities is made of silicon nitride.

5. An alcohol engine with combustion cavity according to claim 2, wherein said nozzle main body for forming each of said fuel injection nozzles is made of silicon carbide.

6. An alcohol engine with combustion cavity according to claim 2, wherein said nozzle main body for forming each of said fuel injection nozzles is made of silicon nitride.

7. An alcohol engine with combustion cavity according to claim 2, wherein said heat-insulating member of said combustion cavity block is made of a low heat conductivity material of aluminum titanate.

8. An alcohol engine with combustion cavity according to claim 2, wherein each of said fuel injection nozzles has multi-injection injection ports formed in multiple stages around the tip portion of said nozzle main body, and the alcohol fuel injected from said multi-stage multi-injection injection ports is diffused outward in the radial direction towards the inner wall surface of said combustion cavity, crosses the intake air flowing as the squish flow from said main combustion chambers to said combustion cavities through said communication ports and promotes mixing between the fuel and air.

9. An alcohol engine with combustion cavity which includes a cylinder block having cylinders for constituting main combustion chambers, a cylinder head fitted to said cylinder block, pistons reciprocating inside said cylinders, combustion cavity blocks for forming combustion cavities of a heat-insulating structure, disposed in said cylinder head, and fuel injection nozzles having injection ports thereof opened to said combustion cavities, wherein:

said alcohol engine includes further communication ports having a heat-insulating structure, for communicating between said main combustion chambers and said combustion cavities so that air intake flows as a squish flow from said main combustion chambers to said combustion cavities through said communication ports;

said fuel injection nozzles each include a nozzle main body extending to the center portion of said combustion cavity and multi-injection injection ports formed around the tip of said nozzle main body and opening in such a manner as to face the center inner peripheral wall surface of said combustion cavity, whereby alcohol fuel atomized from said multi-injection injection ports is diffused in a radial direction inside said combustion cavity; and a protuberance projecting to the center portion of said communication port at the time of the rise of each of said pistons and forming said communication port in a ring-like passage is formed at the piston head portion of each of said pistons.

10. An alcohol engine with combustion cavity according to claim 9, wherein each of said fuel injection nozzles has multi-injection ports formed in multiple stages around the tip portion of said nozzle main body, and said multi-injection injection ports are set at position $\frac{1}{2}$ to $\frac{3}{4}$ of the full length of said combustion cavity away from the upper wall surface of said combustion cavity, and the alcohol fuel injected from said multi-injection ports is diffused outward in the radial direction towards the inner peripheral wall surface of said combustion cavity, crosses the intake air flowing as the squish flow from said main combustion chambers to said combustion cavities through said communication ports and promotes mixing between the fuel and air.

* * * * *